United States Patent
Heo et al.

(10) Patent No.: US 8,416,534 B1
(45) Date of Patent: Apr. 9, 2013

(54) DISK DRIVE WITH ASYMMETRIC TOLERANCE RING

(75) Inventors: Baekho Heo, San Jose, CA (US); Scott E. Watson, San Jose, CA (US); Ryan J. Schmidt, Santa Barbara, CA (US)

(73) Assignee: Western Digital Technologies, Inc., Irvine, CA (US)

(*) Notice: Subject to any disclaimer, the term of this patent is extended or adjusted under 35 U.S.C. 154(b) by 387 days.

(21) Appl. No.: 12/828,103

(22) Filed: Jun. 30, 2010

(51) Int. Cl.
G11B 5/55 (2006.01)
(52) U.S. Cl. .................................... 360/265.6
(58) Field of Classification Search ............... None
See application file for complete search history.

(56) References Cited

U.S. PATENT DOCUMENTS

| | | |
|---|---|---|
| 3,838,928 A | 10/1974 | Blaurock et al. |
| 4,286,894 A | 9/1981 | Rongley |
| 4,790,683 A | 12/1988 | Cramer, Jr. et al. |
| 4,828,423 A | 5/1989 | Cramer, Jr. et al. |
| 5,315,465 A | 5/1994 | Blanks |
| 6,163,441 A | 12/2000 | Wood et al. |
| 6,288,878 B1 | 9/2001 | Misso et al. |
| 6,288,879 B1 | 9/2001 | Misso et al. |
| 6,333,839 B1 | 12/2001 | Misso et al. |
| 6,411,472 B1 | 6/2002 | Allsup |
| 6,480,363 B1 | 11/2002 | Prater |
| 6,606,224 B2 | 8/2003 | Macpherson et al. |
| 6,655,847 B2 * | 12/2003 | Obara et al. ............. 384/535 |
| 6,754,046 B2 | 6/2004 | Barina et al. |
| 7,054,111 B2 | 5/2006 | Dominguez, Jr. et al. |
| 7,085,108 B1 | 8/2006 | Oveyssi et al. |
| 7,611,303 B2 * | 11/2009 | Hanrahan et al. ............. 403/372 |
| 2003/0053260 A1 | 3/2003 | Barina et al. |
| 2005/0225903 A1 | 10/2005 | Sprankle et al. |
| 2006/0181811 A1 | 8/2006 | Hanrahan et al. |
| 2006/0275076 A1 * | 12/2006 | Hanrahan et al. ............. 403/365 |

* cited by examiner

*Primary Examiner* — David D Davis (57) ABSTRACT

Described herein is a tolerance ring for a disk drive that includes a substantially cylindrical body having outer surface. The tolerance ring can be positioned between a rotational bearing and an actuator for providing rotational movement of the actuator. The tolerance ring can also include a contact member, positioned along the outer surface, that protrudes outward from the outer surface. The contact member can be connected to the outer surface by first and second angulated arms that extend from the outer surface to the contact member at different angles relative to the outer surface.

19 Claims, 6 Drawing Sheets

DISK DRIVE WITH ASYMMETRIC TOLERANCE RING

BACKGROUND

Hard disk drives, (HDD) are often used in electronic devices, such as computers, to record data onto or to reproduce data from a recording media, which can be a disk having one or more recording surfaces. The HDD also includes a head for reading the data on a recording surface of the disk and for writing data unto one of the surfaces. An actuator is provided for moving the head over a desired location, or track of the disk.

The HDD includes a spindle motor for rotating the disk during operation. When the disk drive is operated, and the actuator moves the head over the disk, the head is floated a predetermined height above the recording surface of the disk while the disk is rotated, and the head detects and/or modifies the recording surface of the disk to retrieve, record, and/or reproduce data from and/or onto the disk.

When the HDD is not in operation, or when the disk is not rotating, the head can be rotated by the actuator to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
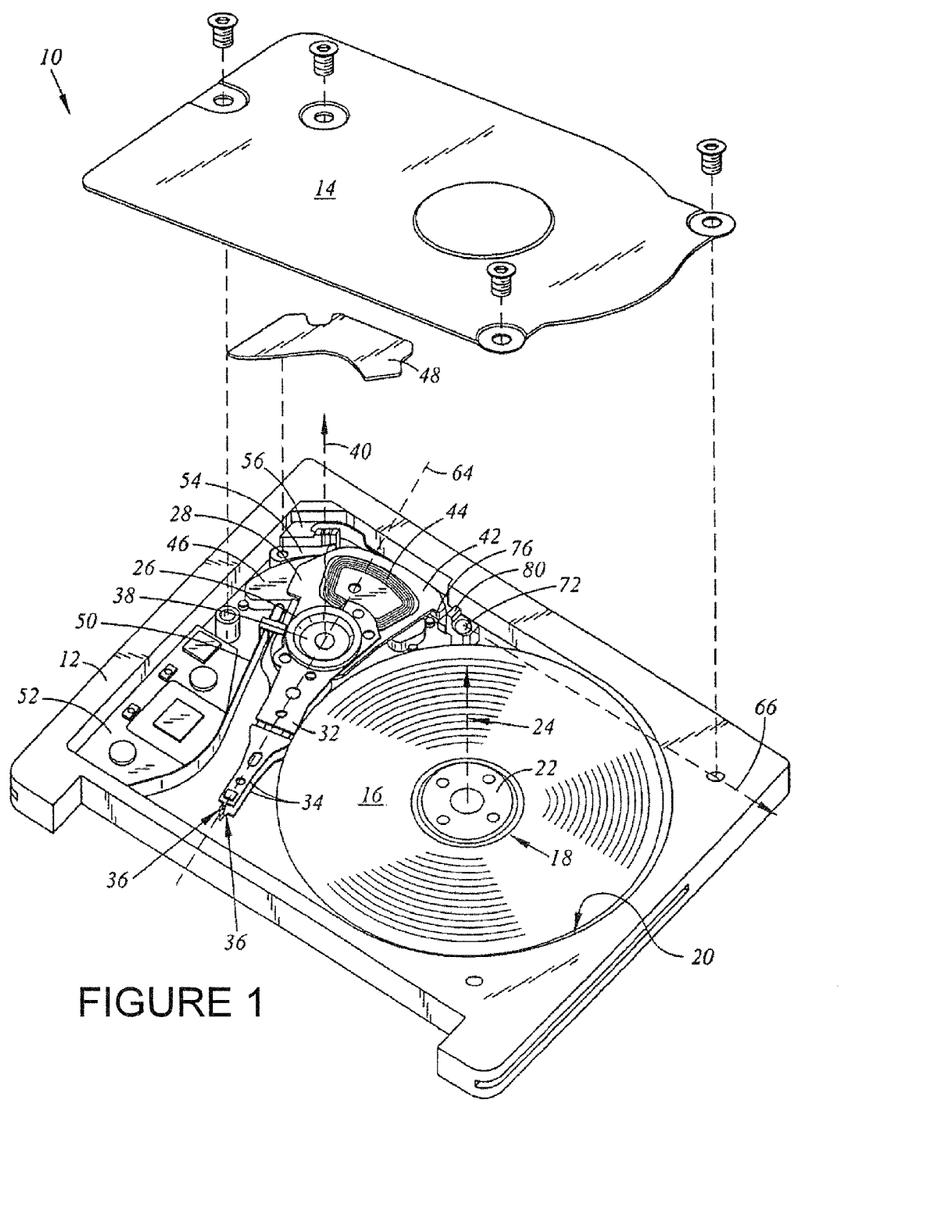
FIG. 1 depicts a perspective view of a disk drive in accordance with one embodiment.

Referring now to FIG. 1, there is depicted an exploded perspective view of a disk drive 10 according to embodiments described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device, however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating the actuator body to rotate between limited positions about an axis of rotation 40.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a fixed portion 56 that is firmly coupled to the disk drive base 12. The latch 54 further includes a latching portion that is engagable with fixed portion 56 to limit rotational movement of the actuator 28. Although the latch 54 is depicted as being located in a corner of the base, the latch 54 could be located in other portions of the disk drive and still perform its functions.

When the actuator 28 is rotated into the parked position, as illustrated in FIG. 1, the actuator 28 can include a contact member 76, which can be located on the coil support element 42 or elsewhere, that is configured to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Data is recorded onto a surface of the disk in a pattern of concentric rings known as data tracks. The disk surface is spun at high speed by means of a motor-hub assembly. Data tracks are recorded onto disk surface by means of the head 36, which typically resides at the end of the actuator arm 32. One skilled in the art understands that what is described for one head-disk combination applies to multiple head-disk combinations.

The dynamic performance of the HDD is a major mechanical factor for achieving higher data capacity as well as for manipulating the data faster. The quantity of data tracks recorded on the disk surface is determined partly by how well the head 36 and a desired data track can be positioned relative to each other and made to follow each other in a stable and controlled manner. There are many factors that can influence the ability of HDD to perform the function of positioning the head 36 and following the data track with the head 36. In general, these factors can be put into two categories; those factors that influence the motion of the head 36; and those factors that influence the motion of the data track. Undesirable motions can come about through unwanted vibration and undesirable tolerances of components.

During development of the HDD, the disk 16 and head 36 have undergone reductions in size. Much of the refinement and reduction has been motivated by consumer request and demand for more compact and portable hard drives 10. For example, the original hard disk drive had a disk diameter many times larger than those being developed and contemplated.

Smaller drives often have small components with relatively very narrow tolerances. For example, disk drive heads 36 are designed to be positioned in very close proximity to the disk surface. Due to the tight tolerances, vibration activity of the actuator arm 32 relative to the disk 16 can adversely affect the performance of the HDD. For example, vibration of the actuator 28 can result in variations in the spacing between the head element and media. Additionally, irregular movement of the disk 16, or vibrations caused by unbalanced rotations, can result in variations in the spacing between the head element and the disk 16, or media.

In addition, as disk drive tracks per inch (TPI) increases, sensitivity to small vibrations also increases. Small vibrations can cause significant off-track and degraded performances. For example, in many cases, variations in the spacing between the head element and media can increase the off-track complications, and the increase in TPI compounds the complications and likely gives rise to data errors. These data errors can include both hard errors during writing and soft errors during reading. Moreover, vibration-induced errors become even more apparent as the actual offset distances and overall components are reduced in size.

Figure 2:
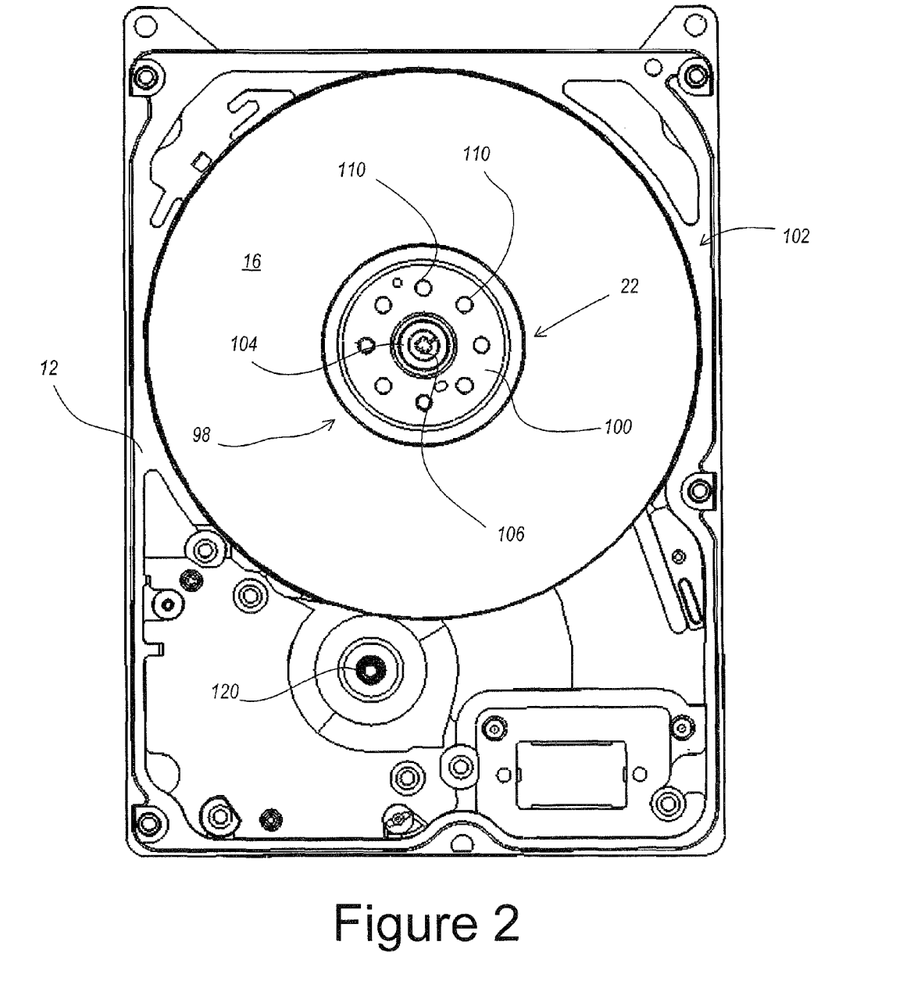
FIG. 2 illustrates a top view of a disk drive in accordance with one embodiment.

Each disk 16 is mounted on a rotatable hub 98 connected to the spindle motor 22 and is secured to the rotatable hub by a disk clamp 100, as illustrated in FIG. 2. Some disk drives 10 include a plurality of disks 16 to provide additional disk surface for storing greater amounts of data. The resulting combination is referred to herein as a motor/disk assembly or as a disk pack 102.

Multiple data storage disks 16 can be mounted on the rotatable hub 98 in vertically and substantially equally spaced relations. One or more bearings 104 are disposed between a motor or spindle shaft 106 and the rotatable hub 98, which is disposed about and rotatable relative to the spindle shaft 106. Electromagnetic forces are used to rotate the hub 98 about the stationary shaft 106 at a desired velocity. Rotational movement of the hub 98 is translated to each of the disks 16 of the disk pack 102, causing the disks 16 to rotate with the hub 98 about the shaft 106.

The disks 16 are rotated about the shaft 106 at a high rate of speed, and consumer demand for quicker data retrieval can result in increased rotational speed of the hub 98 and the disks 16 to provide reduced time in accessing data. Even minor imbalances of the rotating motor/disk assembly 102 can generate significant forces that can adversely affect the ability to accurately position the head 36 relative to the desired track of the corresponding disk 16 while reading from or writing to the disk 16. Excessive imbalance can degrade the disk drive performance not only in terms of read/write errors, but also in terms of seek times. Excessive imbalance may result in an undesirable acoustic signature and may even result in damage or excessive wear to various disk drive components.

The inner diameter 18 of each disk 16 is slightly larger in diameter than an outer periphery of the spindle motor hub, or rotatable hub 98, in order to allow the disks 16 to slip about the spindle motor hub 98 during installation. During assembly, the disks 16 may be positioned in an inexact concentric manner about the spindle motor hub 98. In fact, in some instances, the disks 16 may be intentionally biased against the spindle motor hub 98. This inexact concentric relationship between the disk 16 and the motor hub 98 results in the disk pack 102 becoming imbalanced. This imbalance can be manifest in at least two respects.

First, the rotating mass of each disk 16 results in a centrifugal force radially extending in a direction from the axis of rotation 24 in a plane orthogonal to the axis of rotation 24 that includes the axis of rotation 24. This can be referred to as a single plane or "static" imbalance. Second, the same centrifugal force also results in a moment about an axis extending from the axis of rotation 24 in a plane orthogonal to the axis of rotation through the axis of rotation 24. This can referred to as a dual plane, two plane, or "dynamic" imbalance.

Balancing of the disk pack 102 is preferably conducted, for example, by the manufacturer or during an assembly process, prior to shipping the drive 10 to the consumer. Single plane balancing of the disk pack 102 can include attaching one or more weights to one side of the disk pack 102. Not all imbalances may be alleviated to the desired degree by balancing within a single plane. Dual plane balancing of the disk pack 102 can be achieved by attaching one or more weights at two different elevations along the axis 24 corresponding with vertically spaced reference planes in an attempt to improve upon the potential inadequacies of a single plane balance.

Balancing the disk pack 102 can be accomplished by attaching one or more weights to a central portion of the disk pack 102. For example, as illustrated in FIG. 2, the disk pack 102 can have a portion that holds the one or more weights or to which the one or more weights attach. FIG. 2 illustrates a disk pack 102 having a rotatable hub 98 that includes a disk clamp 100 having a plurality of disk clamp apertures 110 positioned circumferentially about a central portion of the disk pack 102.

Another source of vibrations caused during operation of the disk drive 10 can be rotation of the actuator 28 about the axis of rotation 40. A pivot shaft 120 preferably defines the axis of rotation 40 about which the actuator 28 rotates. As the actuator 28 rotates from the parked position to a position over the disks 16, the initiation of movement from its original stationary position and as the actuator 28 stops at the desired position over the disks 16 can create various vibration modes that can adversely affect performance of the disk drive 10. For example, one vibration mode includes the actuator Butterfly mode (BFM). Modes of vibration can also be encountered as the actuator 28 shifts and moves over the disks 16 during operation of the disk drive 10.

One method of reducing the adverse effects generated by vibrations due to operation of the actuator 28 is to modify the connection between the pivot shaft 120 in the actuator 28.

Figure 3:
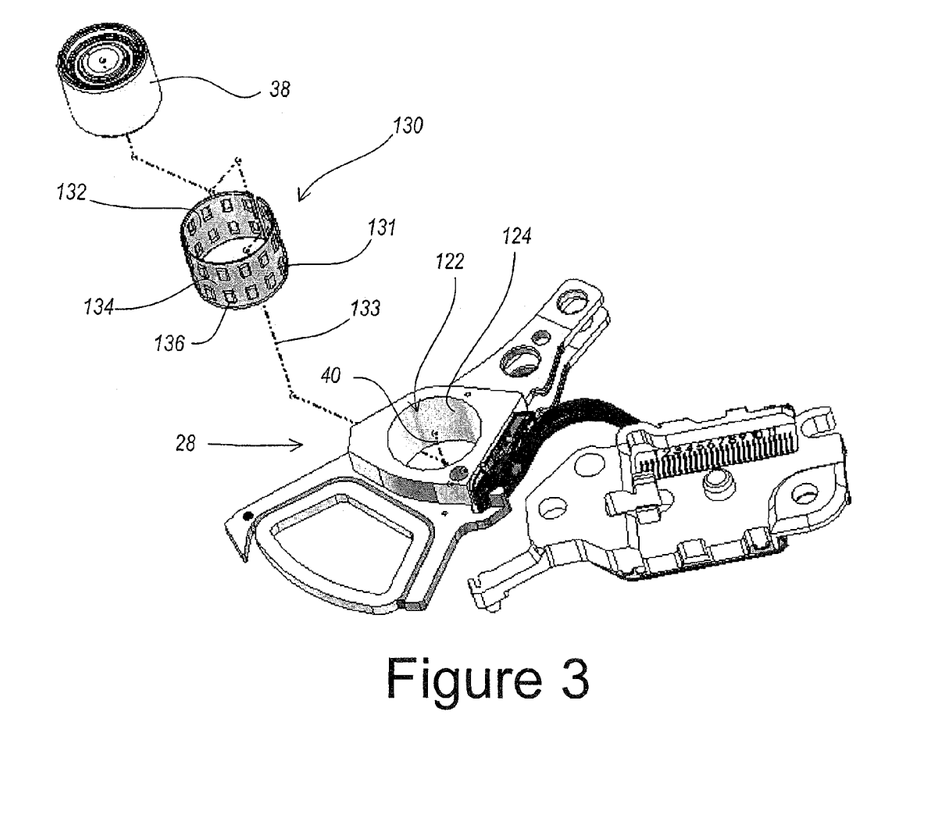
FIG. 3 illustrates a partial exploded view of an actuator in accordance with one embodiment.

FIG. 3 illustrates an exploded view of an actuator 28. The actuator 28 preferably includes an actuator bore 122 that is preferably positioned substantially concentrically with the pivot shaft 120 so as to rotate about the axis of rotation 40. The actuator bore 122 preferably includes a pivot inner surface 124 that defines a substantially cylindrical surface.

A pivot bearing cartridge 38 is positioned over the pivot shaft 120, and the bearing cartridge 38 provides relative rotational movement between the pivot shaft 120 in the actuator 28. In order to secure the actuator 28 to the pivot bearing cartridge 38, a tolerance ring 130 is provided and is pressfit between the bearing cartridge 38 in the actuator 28. The tolerance ring 130 includes an inner surface 132 that engages the bearing cartridge 38 and an outer surface 134 that engages the pivot inner surface 124. Positioned about the outer surface 134 of the tolerance ring 130 can be one or more contact members 136 that provide areas of contact between the tolerance ring 130 and the pivot inner surface 124.

Figure 4:
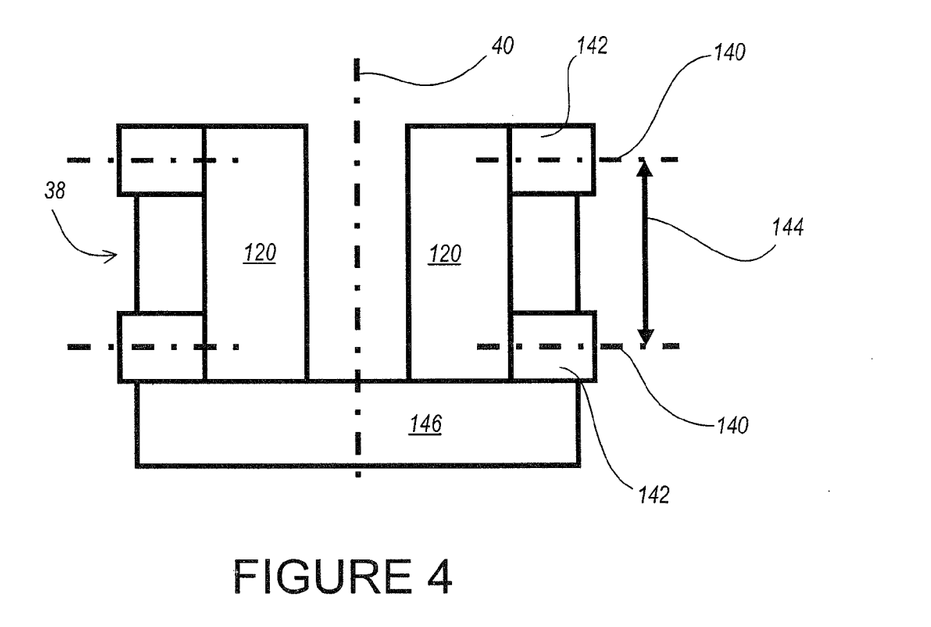
FIG. 4 illustrates a schematic cross-sectional view of a pivot shaft and bearing.
Figure 5:
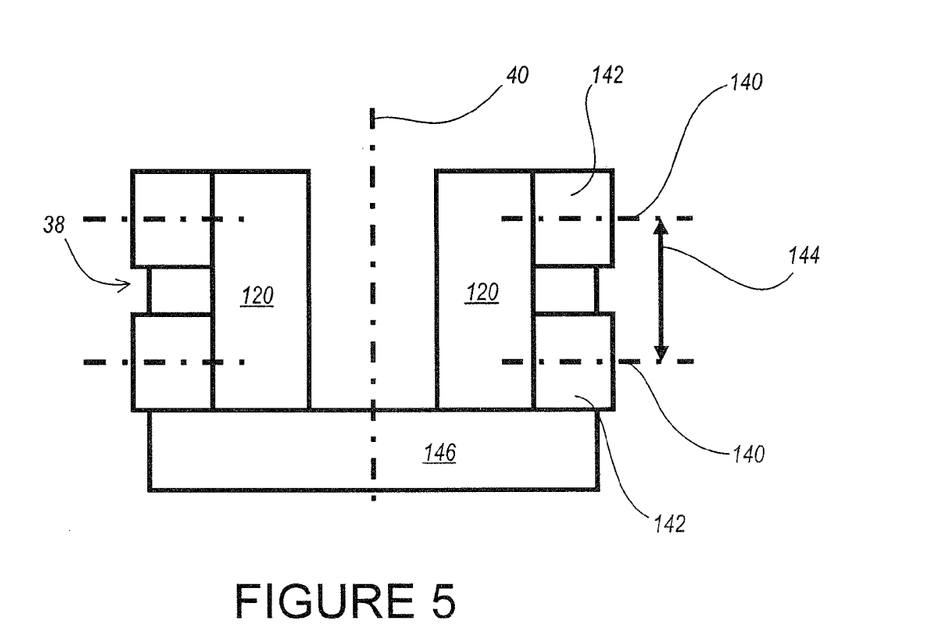
FIG. 5 illustrates another schematic cross-sectional view of a pivot shaft and bearing.

With reference to FIGS. 4 and 5, multiple bearing cartridges 38 can be used for various applications depending on the desired performance of the bearing cartridge 38. The bearing cartridge 138 includes a bearing line 140 that extends in a direction substantially transverse to the axis of rotation 40. The bearing line 140, in some embodiments, defines a line or a plane, about the axis of rotation 40, that is aligned with pivots or bearings 142 of the bearing cartridge 38. A pivot bearing span 144 is a distance between bearing lines 140 of a bearing cartridge 38 that are positioned along the axis of rotation 40. Some applications include a bearing cartridge 38 with pivots 142 position along the axis of rotation 40 such that one bearing line 140 is positioned adjacent a pivot shaft base 146, and another bearing line 140 is spatially positioned along the axis of rotational 40.

In some applications, it is desirable to use bearing cartridges 38 that include relatively larger pivot bearings 142. For example, in some instances, using larger pivot bearings 142 can achieve greater performance of the actuator 28 in connection with various vibration modes. As larger pivot bearings 142 are used, the pivot bearing span 144 can decrease, as reflected in FIG. 5 relative to FIG. 4. As the pivot bearing span 144 changes, the contact members 136 of the tolerance ring 130 preferably accommodate the span 144 changes.

Figure 6:
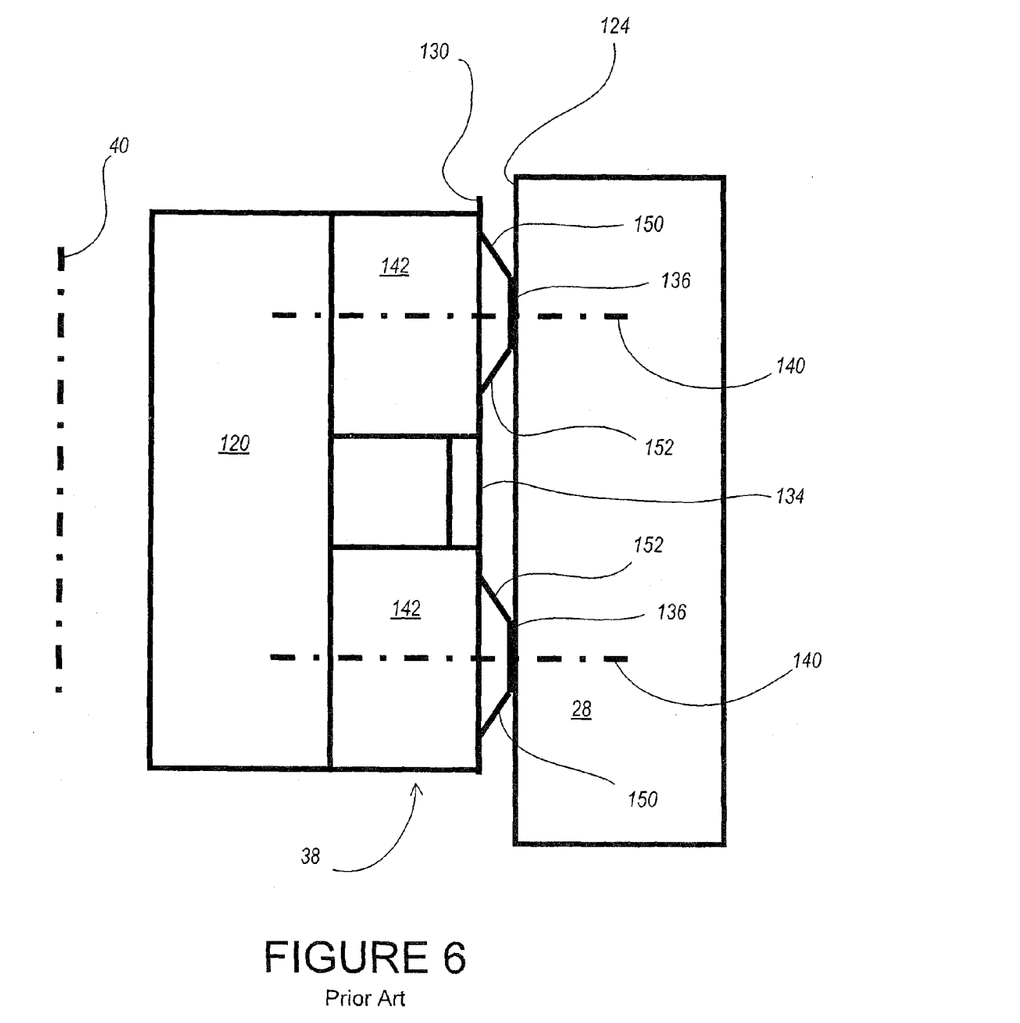
FIG. 6 illustrates a schematic view of a tolerance ring coupling an actuator to a pivot shaft.

FIG. 6 illustrates a schematic view of the coupling between a pivot shaft 120 and an actuator 28. Positioned circumferentially about the pivot shaft 120 is the bearing cartridge 38, which provides relative rotational movement between the pivot shaft 120 and the actuator 28 about the axis of rotation 40. The actuator 28 is coupled to the bearing cartridge 38 by a tolerance ring 130 that is pressfit between the pivot bearings 142 of the bearing cartridge 38 and the pivot inner surface 124 of the actuator 28.

Positioned along the tolerance ring outer surface 134 are one or more contact members 136 that are raised from the tolerance ring outer surface 134 by one or more chamfers, which can include an outer chamfer 150 and an inner chamfer 152. The contact members 136 can be aligned with a respective bearing line 141 when the tolerance ring 130 is positioned in the disk drive 10.

When the tolerance ring 130 is positioned between the bearing cartridge 38 and the actuator 28, the tolerance ring 130 is preferably elastically deformed along at least a portion of at least one of the outer chamfer 150, the inner chamfer 152, and the contact number 136 to provide a compliant coupling between the bearing cartridge 38 and the actuator 28.

Figure 7:
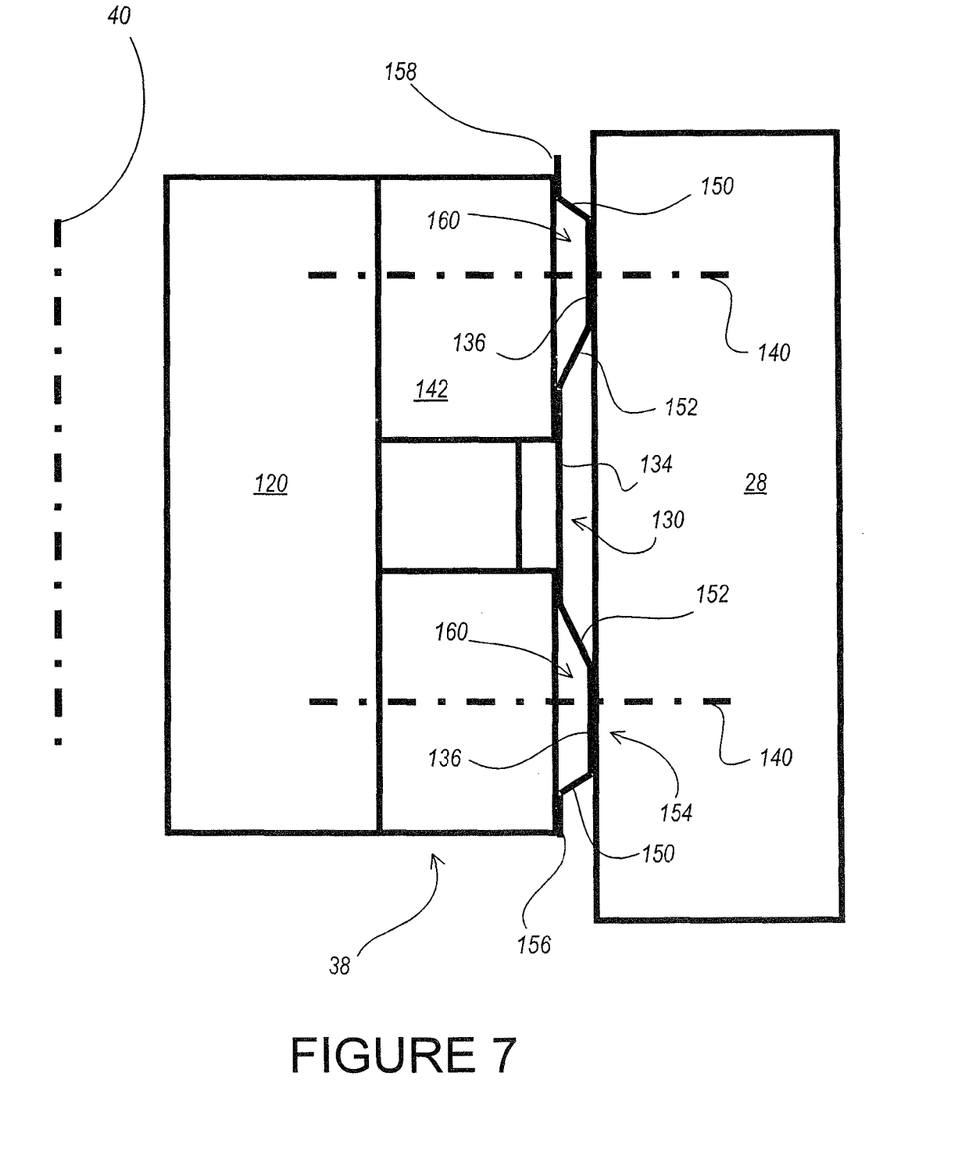
FIG. 7 illustrates another schematic view of a tolerance ring coupling an actuator to a pivot shaft.

FIG. 7 illustrates embodiments of a tolerance ring 130 that is used to couple an actuator 28 to a bearing cartridge 38 for providing relative rotational movement between the actuator 28 and the pivot shaft 120 about the axis of rotation 40. In one embodiment, the tolerance ring 130 includes an outer chamfer 150 that it extends from the outer surface 134 to the contact member 136 at a steeper angle than the inner chamfer 152 extends from the outer surface 134 to the contact member 136. In some embodiments, the inner chamfer 152 is elastically deformed to a greater extent than that of the outer chamber 150 when the tolerance ring 130 is positioned within the disk drive 10.

The tolerance ring 130 can include asymmetric bump chamfers that shift the contact area between the tolerance ring 130 and the pivot inner surface 124 of the actuator 28, and the ring 130 enables wider contact between the pivot bearings 142 and the pivot inner surface 124 along the bearing line 144. This construction of the tolerance ring 130 can improve performance of the disk drive, including with respect to butterfly mode frequency, pivot rocking amplitude, and pivot friction variation. For example, a tolerance ring having symmetric chamfers has a BFM at 7600 Hz, while the BFM frequency is shifter higher by about 15.8% to about 8800 Hz by providing a tolerance ring having asymmetric chamfers. This increase in BFM frequency enables higher actuator bandwidth, and higher actuator bandwidth leads to higher performance disk drives 10, when considering higher capacities and faster read/write processes.

In one embodiment, the tolerance ring 130, with asymmetric chamfers 150, 152, generates a higher stiffness along the outer chamfer 150 then the inner chamfer 152. In one embodiment, the outer chamfer 150 can extend from the outer surface 134 of the tolerance ring 130 to the contact member 136 at an angle between about 15° and about 45°. In one embodiment, the outer chamfer 150 can extend from the outer surface 134 to the contact member 136 at an angle of about 24°. In some embodiments, the outer chamfer 150 can extend from the outer surface 134 to the contact member 136 at an angle less than about 15°, and in some embodiments, the outer chamfer 150 can extend from the outer surface 134 to the contact member 136 at an angle greater than about 45°.

In one embodiment, the inner chamfer 152 can extend from the outer surface 134 to the contact member 136 at an angle between about 5° and about 35°. In one embodiment, the inner chamfer 152 can extend from the outer surface 134 to the contact member 136 at an angle of about 17°. In some embodiments, the inner chamfer 152 can extend from the outer surface 134 to the contact member 136 at an angle less than about 5°, and in some embodiments, the inner chamfer 152 can extend from the outer surface 134 to the contact member 136 at an angle greater than about 35°.

In one embodiment, the disk drive 10 can include an actuator assembly having a rotation axis 40 that is configured to rotate about the axis 40. The drive 10 can include a bearing 38 that is configured to provide rotational movement of the actuator assembly about the axis 40. The drive 10 can also include a substantially cylindrical tolerance ring 130 having an internal wall and an external wall, and the tolerance ring 130 can be configured to engage the bearing 38 along the internal wall. The tolerance ring 130 can also have a contact member 136, for engaging the actuator assembly, along the external wall. The contact member 136 can have a contact surface 154, protruding outward from the external wall, and the contact surface 154 can be connected to the external wall by two angulated walls, or chamfers 150, 152, that extend on opposing ends of the contact surface 154. In one embodiment, the two angulated walls, or chamfers 150, 152, extend from the external wall to the contact surface 154 at different angles.

In one embodiment, the tolerance ring 130 includes a bottom edge 156 and a top edge 158, and the contact member 136 is positioned along the external wall closer to one of the bottom edge 156 and the top edge 158. In some embodiments, a first angulated wall of the two angulated walls is positioned closer to the one of the bottom edge 156 and the top edge 158 than a second angulated wall of the two angulated walls. Some embodiments provide that the first angulated wall extends from the external wall at a greater angle than the second angulated wall. Some embodiments provide that the first angulated wall extends from the external wall at an angle of from about 15° to about 45°, and some embodiments provide that the second angulated wall extends from the external wall at an angle of from about 5° to about 35°. In some embodiments, the contact surface extends in a direction that is substantially parallel to the external wall, and in some embodiments, the contact surface extends is a direction that is substantially parallel to the axis of rotation 40.

The tolerance ring can include a plurality of contact members 136 along the outer surface 134. In some embodiments, the plurality of contact members are positioned circumferentially about the substantially cylindrical tolerance ring. In some embodiments, the plurality of contact members define an annular contact region about the external wall of the tolerance ring. In some embodiments, the tolerance ring 130 defines a ring axis, which can be contiguous with or substantially identical to, the axis of rotation 40 when the ring 130 is assembled in the drive 10, and the plurality of contact members 136 can be positioned at different locations along the axis 40. Some embodiments provide that the bearing 38 includes a ball bearing, which can be contained within or defined by the pivot bearing 142, and the contact member 136 can be positioned adjacent the ball bearing when the tolerance ring 130 is positioned between and engages the bearing and the actuator assembly.

In one embodiment, a tolerance ring for a disk drive includes a substantially cylindrical body 131 having an internal surface 132 and an external, or outer, surface 134. The tolerance ring can be configured to be positioned about, and to engage along the internal surface 132, a rotational bearing 38, the cylindrical body defining an axis 133, which can be contiguous with an axis of rotation 40. The tolerance ring 130 can also include a contact member 136 positioned along the external surface 134, and the contact member can include a contact surface 154 that protrudes outward from the external surface 134 such that the contact surface 154 is spaced at a greater radial distance from the axis 133 than the external surface 134. The contact member 136 can be connected to the external surface 134 by a first angulated arm 150 and a second angulated arm 152. In one embodiment, the first and second angulated arms 150, 152 extend from the external surface 134 to the contact surface 154 at different angles.

Some embodiments provide that the first angulated arm 150 is positioned closer to one of a bottom edge 156 of the ring and a top edge 158 of the ring 130 than the second angulated arm 152. The first angulated arm can extend, in some embodiments, from the external surface 134 at a greater angle than the second angulated arm 152. Some embodiments provide that the ring include a plurality of contact members 136, and the plurality of contact members 136 can be positioned at different locations along the ring axis 40. In some embodiments, the plurality of contact members 136 form at least two annular contact regions 160 about the ring 130, the two contact regions 160 being spaced along the ring axis 133.

The description of the invention is provided to enable any person skilled in the art to practice the various embodiments described herein. While the embodiments have been particularly described with reference to the various figures and disclosure, it should be understood that these are for illustration purposes only and should not be taken as limiting the scope of the inventions.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive comprising:
    an actuator assembly having a rotation axis and being configured to rotate about the axis;
    a bearing configured to provide rotational movement of the actuator assembly about the axis; and
    a substantially cylindrical tolerance ring having an internal wall and an external wall, the tolerance ring being configured to engage the bearing along the internal wall and having a contact member, for engaging the actuator assembly, along the external wall, the contact member comprising a contact surface protruding outward from the external wall, the contact surface being connected to the external wall by two angulated walls extending on opposing ends of the contact surface, wherein the two angulated walls extend from the external wall to the contact surface at different angles, and wherein the contact surface extends in a direction that is substantially parallel to the external wall.

2. The disk drive of claim 1, wherein the tolerance ring comprises a bottom edge and a top edge, and the contact member is positioned along the external wall closer to one of the bottom edge and the top edge.

3. The disk drive of claim 2, wherein a first angulated wall of the two angulated walls is positioned closer to the one of the bottom edge and the top edge than a second angulated wall of the two angulated walls.

4. The disk drive of claim 3, wherein the first angulated wall extends from the external wall at a greater angle than the second angulated wall.

5. The disk drive of claim 4, wherein the first angulated wall extends from the external wall at an angle of from about 15° to about 45°.

6. The disk drive of claim 4, wherein the second angulated wall extends from the external wall at an angle of from about 5° to about 35°.

7. The disk drive of claim 1, wherein the tolerance ring comprises a plurality of contact members.

8. The disk drive of claim 7, wherein the plurality of contact members are positioned circumferentially about the substantially cylindrical tolerance ring.

9. The disk drive of claim 7, wherein the plurality of contact members define an annular contact region about the external wall of the tolerance ring.

10. The disk drive of claim 7, wherein the cylindrical ring defines a ring axis, and the plurality of contact members are positioned at different locations along the ring axis.

11. The disk drive of claim 1, wherein the bearing comprises a ball bearing, and the contact member is positioned adjacent the ball bearing when the tolerance ring is positioned between and engages the bearing and the actuator assembly.

12. A tolerance ring for a disk drive, the tolerance ring comprising:
 a substantially cylindrical body having an internal wall and an external wall, the tolerance ring being configured to be positioned about, and to engage along the internal wall, a rotational bearing, the cylindrical body defining an axis; and
 a contact member positioned along the external wall, the contact member comprising a contact surface protruding outward from the external wall such that the contact surface is spaced at a greater radial distance from the axis than the external wall, the contact surface being connected to the external wall by a first angulated arm and a second angulated arm;
 wherein the first and second angulated arms extend from the external wall to the contact surface at different angles, and wherein the contact surface extends in a direction that is substantially parallel to the external wall.

13. The tolerance ring of claim 12, wherein the first angulated arm is positioned closer to one of a bottom edge of the ring and a top edge of the ring than the second angulated arm, and the first angulated arm extends from the external wall at a greater angle than the second angulated arm.

14. The tolerance ring of claim 13, wherein the first angulated arm extends from the external wall at an angle of from about 15° to about 45°.

15. The tolerance ring of claim 13, wherein the second angulated arm extends from the external wall at an angle of from about 5° to about 35°.

16. The tolerance ring of claim 12, wherein the tolerance ring comprises a plurality of contact members.

17. The tolerance ring of claim 16, wherein the plurality of contact members are positioned circumferentially about the substantially cylindrical body.

18. The tolerance ring of claim 16, wherein the plurality of contact members are positioned at different locations along the axis.

19. The tolerance ring of claim 16, wherein the plurality of contact members form two annular contact regions about the ring, the two contact regions being spaced along the axis.

* * * * *